United States Patent
Maekawa

(10) Patent No.: US 8,125,537 B2
(45) Date of Patent: Feb. 28, 2012

(54) IMAGE PROCESSING METHOD AND IMAGING APPARATUS USING THE SAME

(75) Inventor: Takashi Maekawa, Tokyo (JP)

(73) Assignee: Kyocera Corporation, Kyoto (JP)

( * ) Notice: Subject to any disclaimer, the term of this patent is extended or adjusted under 35 U.S.C. 154(b) by 915 days.

(21) Appl. No.: 12/163,521

(22) Filed: Jun. 27, 2008

(65) Prior Publication Data

US 2009/0002523 A1    Jan. 1, 2009

(30) Foreign Application Priority Data

Jun. 28, 2007    (JP) ................ 2007-170612

(51) Int. Cl.
- *H04N 5/76* (2006.01)
- *H04N 5/228* (2006.01)
- *H04N 5/217* (2006.01)
- *H04N 5/335* (2006.01)
- *G06K 9/32* (2006.01)

(52) U.S. Cl. ............... 348/231.2; 348/222.1; 348/231.3; 348/231.6; 348/241; 348/272; 382/293; 382/295; 382/298; 382/300

(58) Field of Classification Search .............. None
See application file for complete search history.

(56) References Cited

U.S. PATENT DOCUMENTS

| | | |
|---|---|---|
| 3,739,089 A | 6/1973 | Latall |
| 5,664,243 A | 9/1997 | Okada et al. |
| 5,748,371 A | 5/1998 | Cathey, Jr. et al. |
| 6,021,005 A | 2/2000 | Cathey, Jr. et al. |
| 6,069,738 A | 5/2000 | Cathey, Jr. et al. |
| 6,148,528 A | 11/2000 | Jackson |
| 6,233,060 B1 | 5/2001 | Shu et al. |
| 6,241,656 B1 | 6/2001 | Suga |
| 6,449,087 B2 | 9/2002 | Ogino |
| 6,525,302 B2 | 2/2003 | Dowski |

(Continued)

FOREIGN PATENT DOCUMENTS

JP    S63-229851 A    9/1988

(Continued)

OTHER PUBLICATIONS

Office Action dated Mar. 10, 2010 issued for U.S. Appl. No. 11/773,792.

(Continued)

*Primary Examiner* — Jason Chan
*Assistant Examiner* — Michael Osinki
(74) *Attorney, Agent, or Firm* — Procopio, Cory, Hargreaves & Savitch LLP

(57) ABSTRACT

An image processing method includes storing corresponding addresses of original image data in respective addresses of a look-up table, the number of the respective addresses being smaller than the number of addresses that are necessary in output image data; determining whether the addresses of the original image data corresponding to the addresses of the output image data exist in the look-up table; calculating the addresses of the original image data in a first interpolation process if the addresses do not exist in the look-up table; and generating the output image data corresponding to the addresses of the output image data in a second interpolation process based on the original image data by using at least one of the calculated addresses of the original image data and the addresses of the original image data in the look-up table.

13 Claims, 9 Drawing Sheets

U.S. PATENT DOCUMENTS

| | | | |
|---|---|---|---|
| 6,606,669 | B1 | 8/2003 | Nakagiri |
| 6,642,504 | B2 | 11/2003 | Cathey, Jr. |
| 6,984,206 | B2 | 1/2006 | Kumei et al. |
| 7,158,660 | B2 | 1/2007 | Gee et al. |
| 7,400,393 | B2 | 7/2008 | Shibata et al. |
| 7,583,301 | B2 | 9/2009 | Sakurai et al. |
| 7,630,584 | B2 | 12/2009 | Nose et al. |
| 7,719,597 | B2 * | 5/2010 | Okada et al. ............... 348/335 |
| 7,932,934 | B2 * | 4/2011 | Maekawa ................ 348/231.3 |
| 2002/0118457 | A1 | 8/2002 | Dowski |
| 2003/0076514 | A1 | 4/2003 | Gallagher et al. |
| 2003/0122926 | A1 | 7/2003 | Kumei et al. |
| 2003/0158503 | A1 | 8/2003 | Matsumoto |
| 2003/0218683 | A1 * | 11/2003 | Kurase ........................ 348/335 |
| 2004/0136605 | A1 | 7/2004 | Seger et al. |
| 2004/0190762 | A1 | 9/2004 | Dowski et al. |
| 2005/0053307 | A1 * | 3/2005 | Nose et al. ................. 382/275 |
| 2005/0128342 | A1 | 6/2005 | Izukawa |
| 2006/0012385 | A1 | 1/2006 | Tsao et al. |
| 2006/0188172 | A1 * | 8/2006 | Higurashi et al. .......... 382/275 |
| 2007/0086674 | A1 | 4/2007 | Guan |
| 2007/0188633 | A1 * | 8/2007 | Mandy et al. .............. 348/241 |
| 2007/0268376 | A1 | 11/2007 | Yoshikawa et al. |
| 2007/0291152 | A1 | 12/2007 | Suekane et al. |
| 2008/0007797 | A1 | 1/2008 | Hayashi |
| 2008/0043126 | A1 | 2/2008 | Hayashi |
| 2008/0074507 | A1 | 3/2008 | Ohara et al. |
| 2008/0081996 | A1 | 4/2008 | Grenon et al. |
| 2008/0186384 | A1 * | 8/2008 | Ishii et al. .................... 348/187 |
| 2008/0259275 | A1 | 10/2008 | Aoki et al. |
| 2008/0278592 | A1 | 11/2008 | Kuno et al. |
| 2009/0066811 | A1 * | 3/2009 | Maekawa ................ 348/231.3 |

FOREIGN PATENT DOCUMENTS

| | | |
|---|---|---|
| JP | 03-010380 | 1/1991 |
| JP | 1991-010380 | 1/1991 |
| JP | H03-175403 A | 7/1991 |
| JP | H06-130267 A | 5/1994 |
| JP | H08-128923 A | 5/1996 |
| JP | 10-145667 | 5/1998 |
| JP | 1998-145667 | 5/1998 |
| JP | 11-261868 | 9/1999 |
| JP | 1999-261868 | 9/1999 |
| JP | 2000-050146 A | 2/2000 |
| JP | 2000-098301 A | 7/2000 |
| JP | 2000-266979 A | 9/2000 |
| JP | 2000-275582 A | 10/2000 |
| JP | 2001-257930 A | 9/2001 |
| JP | 2001-346069 A | 12/2001 |
| JP | 2002-027047 A | 1/2002 |
| JP | 2002-127852 A | 5/2002 |
| JP | 2002-221657 A | 9/2002 |
| JP | 2003-185905 A | 7/2003 |
| JP | 2003-235794 A | 8/2003 |
| JP | 2003-244530 A | 8/2003 |
| JP | 2003-248171 A | 9/2003 |
| JP | 2003-262778 A | 9/2003 |
| JP | 2003-283878 A | 10/2003 |
| JP | 2004-037733 A | 2/2004 |
| JP | 2004-147188 A | 5/2004 |
| JP | 2004-153497 A | 5/2004 |
| JP | 2004-264577 A | 9/2004 |
| JP | 2004-328506 A | 11/2004 |
| JP | 2005-326684 A | 11/2004 |
| JP | 2006-139246 A | 1/2006 |
| JP | 2006-049949 A | 2/2006 |
| JP | 2006-094112 A | 4/2006 |
| JP | 2006-154767 A | 6/2006 |
| JP | 2006-308987 A | 11/2006 |
| JP | 2007-060647 A | 3/2007 |
| JP | 2007-300208 A | 11/2007 |
| JP | 2008-017157 A | 1/2008 |
| JP | 2008-035282 A | 2/2008 |
| WO | 20061022373 A1 | 3/2006 |
| WO | 2007/013621 A1 | 2/2007 |
| WO | 20071074649 A1 | 7/2007 |

OTHER PUBLICATIONS

Final Office Action dated Aug. 18, 2010 issued for U.S. Appl. No. 11/773,792.

Office Action dated Jun. 10, 2010 issued for U.S. Appl. No. 11/861,217.

International Search Report dated May 12, 2009 issued by the Japanese Patent Office for International Application No. PCT/JP2009/056376.

Office Action dated Jan. 19, 2011 issued by the Japanese Patent Office for Japanese Application No. JP 2006-259646.

Dowski, Edward R. Jr., et al., "Wavefront Coding: a modern method of archieving high-performance and/or low-cost imaging systems", Current Developments in Optical Designs and Optical Engineering VIII, Proc. SPIE vol. 3779, p. 137-145, Oct. 1999.

Dowski, Edward R. Jr., et al., "Wavefront Coding: jointly optimized optical and digital imaging systems", Ed. Proc. SPIE Visual Information Processing IX, Vol. 4041, p. 114-120, Apr. 25, 2000.

Dowski, Edward R. Jr., "Extended Depth of Field through Wave-Front Coding", Appl. Opt. vol. 34, p. 1859-1866 (1995).

* cited by examiner

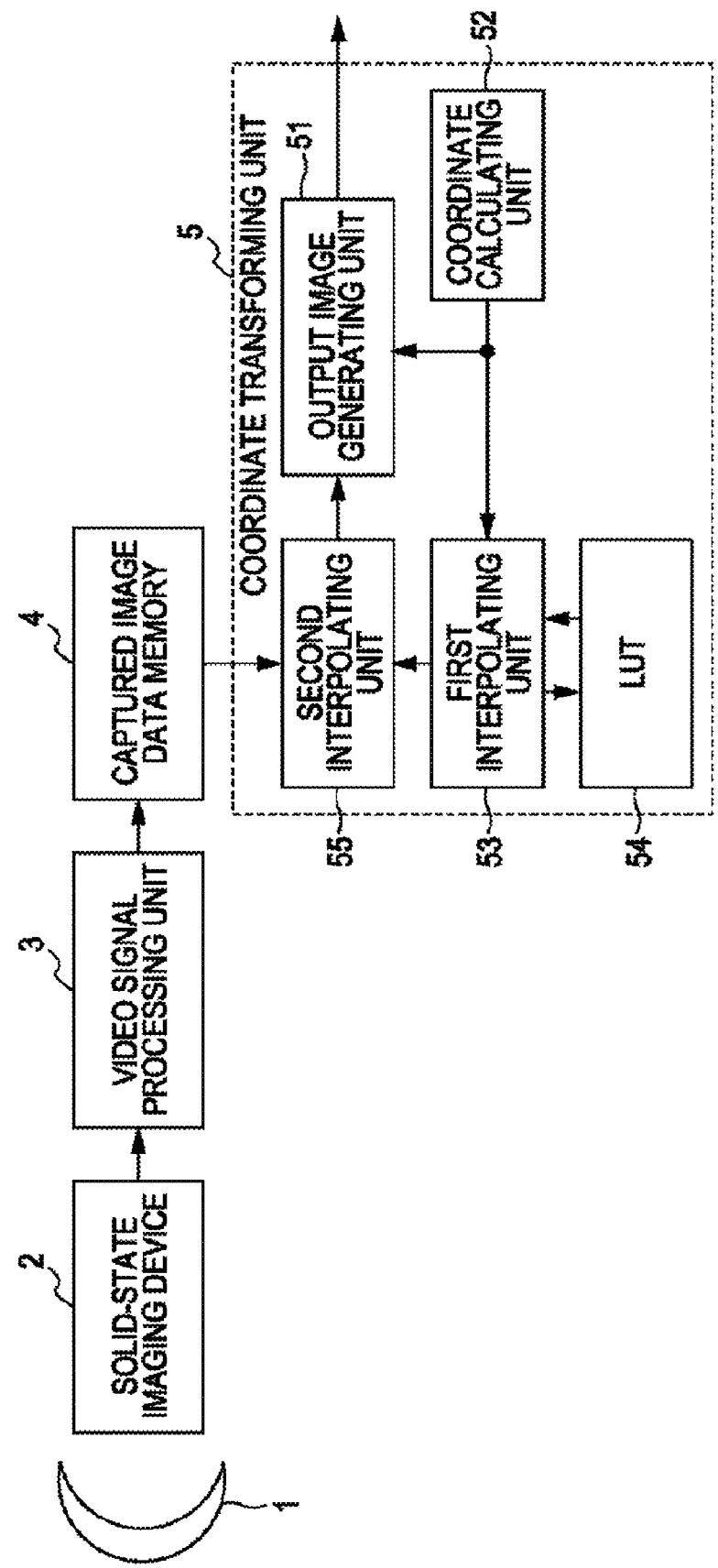

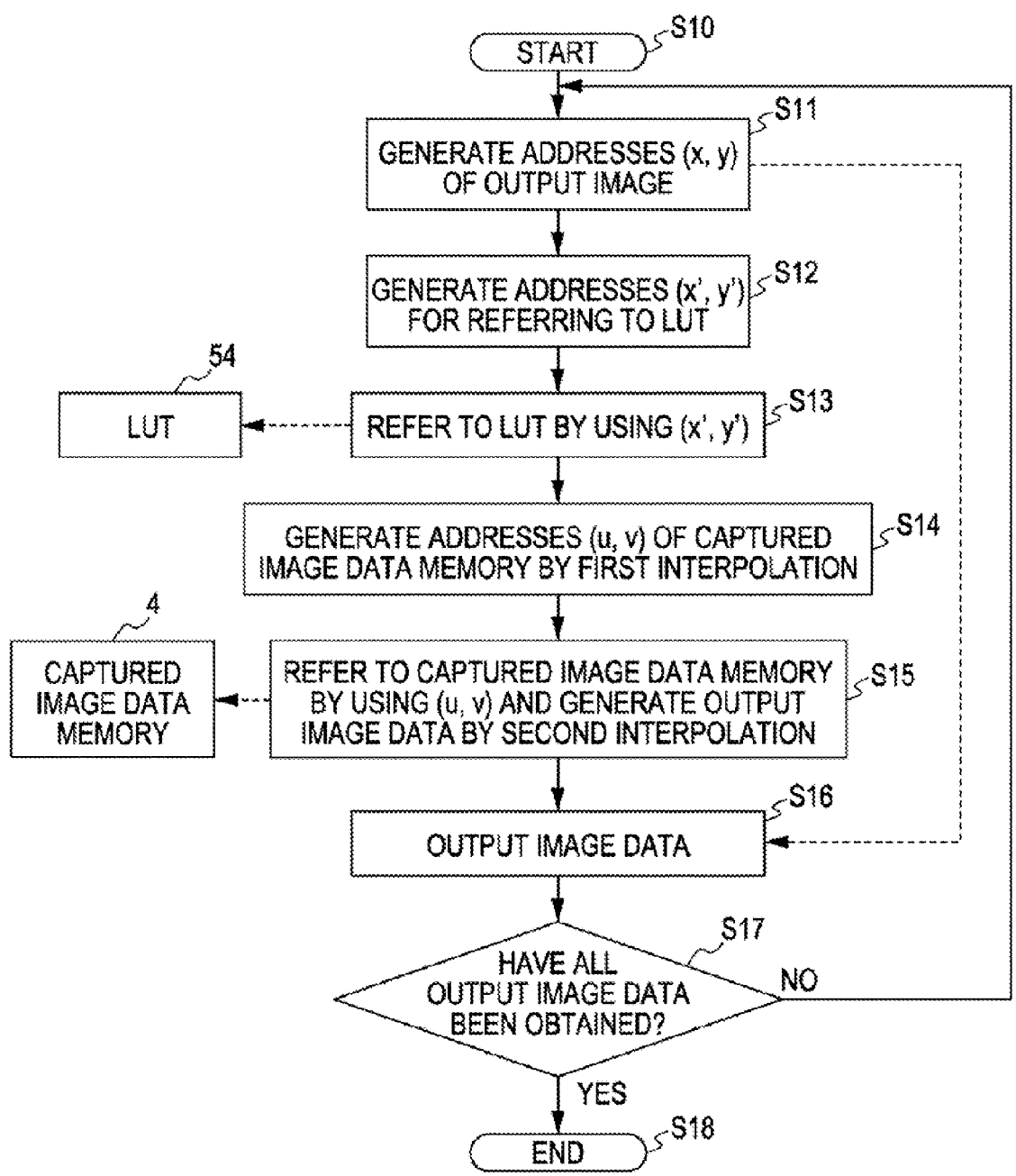

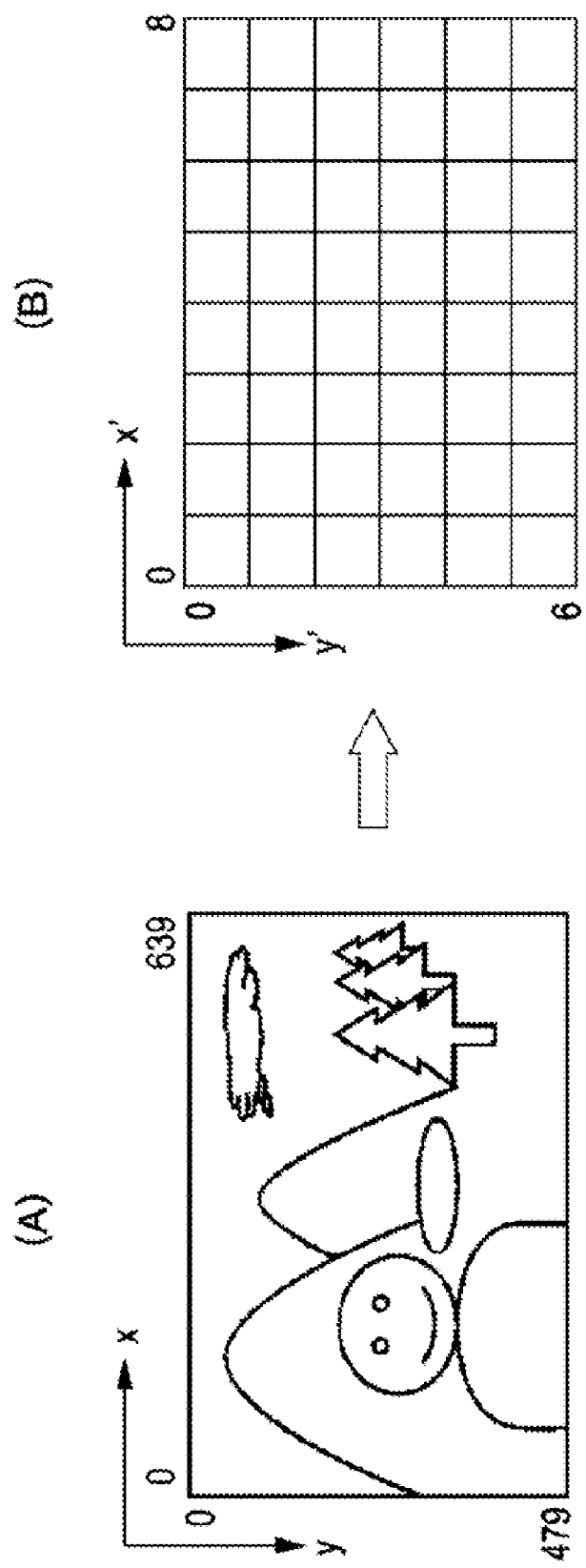

| y'\x' | 0 | 1 | 2 | 3 | 4 | 5 | 6 | 7 | 8 |
|---|---|---|---|---|---|---|---|---|---|
| 0 | u00 v00 | u10 v10 | u20 v20 | u30 v30 | u40 v40 | u50 v50 | u60 v60 | u70 v70 | u80 v80 |
| 1 | u01 v01 | u11 v11 | u21 v21 | u31 v31 | u41 v41 | u51 v51 | u61 v61 | u71 v71 | u81 v81 |
| 2 | u02 v02 | u12 v12 | u22 v22 | u32 v32 | u42 v42 | u52 v52 | u62 v62 | u72 v72 | u82 v82 |
| 3 | u03 v03 | u13 v13 | u23 v23 | u33 v33 | u43 v43 | u53 v53 | u63 v63 | u73 v73 | u83 v83 |
| 4 | u04 v04 | u14 v14 | u24 v24 | u34 v34 | u44 v44 | u54 v54 | u64 v64 | u74 v74 | u84 v84 |
| 5 | u05 v05 | u15 v15 | u25 v25 | u35 v35 | u45 v45 | u55 v55 | u65 v65 | u75 v75 | u85 v85 |
| 6 | u06 v06 | u16 v16 | u26 v26 | u36 v36 | u46 v46 | u56 v56 | u66 v66 | u76 v76 | u86 v86 |

LOWER-ORDER BITS | HIGHER-ORDER BITS

| 15 | 14 | 13 | 12 | 11 | 10 | 9 | 8 | 7 | 6 | 5 | 4 | 3 | 2 | 1 | 0 |

FIG. 6A

| y'\x' | 0 | 1 | 2 | 3 | 4 | 5 | 6 | 7 | 8 |
|---|---|---|---|---|---|---|---|---|---|
| 0 | u00 | u10 | u20 | u30 | u40 | u50 | u60 | u70 | u80 |
| 1 | u01 | u11 | u21 | u31 | u41 | u51 | u61 | u71 | u81 |
| 2 | u02 | u12 | u22 | u32 | u42 | u52 | u62 | u72 | u82 |
| 3 | u03 | u13 | u23 | u33 | u43 | u53 | u63 | u73 | u83 |
| 4 | u04 | u14 | u24 | u34 | u44 | u54 | u64 | u74 | u84 |
| 5 | u05 | u15 | u25 | u35 | u45 | u55 | u65 | u75 | u85 |
| 6 | u06 | u16 | u26 | u36 | u46 | u56 | u66 | u76 | u86 |

FIG. 6B

| y'\x' | 0 | 1 | 2 | 3 | 4 | 5 | 6 | 7 | 8 |
|---|---|---|---|---|---|---|---|---|---|
| 0 | v00 | v10 | v20 | v30 | v40 | v50 | v60 | v70 | v80 |
| 1 | v01 | v11 | v21 | v31 | v41 | v51 | v61 | v71 | v81 |
| 2 | v02 | v12 | v22 | v32 | v42 | v52 | v62 | v72 | v82 |
| 3 | v03 | v13 | v23 | v33 | v43 | v53 | v63 | v73 | v83 |
| 4 | v04 | v14 | v24 | v34 | v44 | v54 | v64 | v74 | v84 |
| 5 | v05 | v15 | v25 | v35 | v45 | v55 | v65 | v75 | v85 |
| 6 | v06 | v16 | v26 | v36 | v46 | v56 | v66 | v76 | v86 |

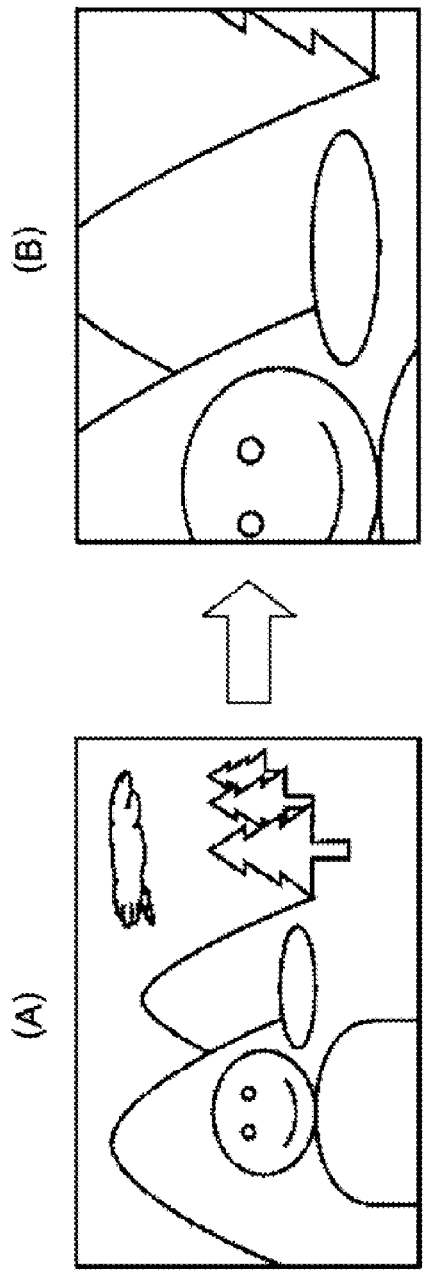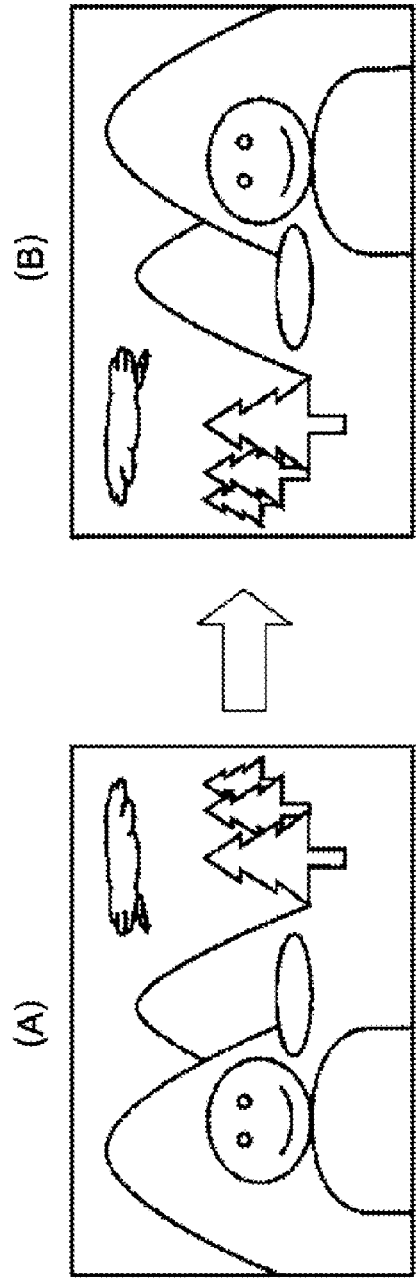

IMAGE PROCESSING METHOD AND IMAGING APPARATUS USING THE SAME

CROSS-REFERENCE TO RELATED APPLICATION

The present application claims priority under 35 U.S.C. §119 to Japanese Patent Application No. 2007-170612, filed Jun. 28, 2007, entitled "IMAGE PROCESSING METHOD AND IMAGING APPARATUS USING THE SAME," the entirety of which is incorporated by reference herein.

BACKGROUND OF THE INVENTION

1. Field of the Invention

The present invention relates to an image processing method and an imaging apparatus using the image processing method. Particularly, the present invention relates to an image processing method enabling various types of image processing to be performed at high speed, such as correction of an image having distortion due to distortion aberration of an imaging lens, an image having unnatural perspective distortion of a subject due to high-angle or overhead photography, generation of an image with a viewpoint changed, mirror-image conversion of a captured image, and electronic zooming, and also relates to an imaging apparatus using the image processing method.

2. Description of the Related Art

Imaging lenses typically used for cameras and the like have various types of aberration, such as spherical aberration, astigmatism and comatic aberration. Among them, aberration causing geometrical distortion of a captured image is called distortion aberration. As typical measures for reducing the distortion aberration, a lens exhibiting minimized distortion aberration is designed.

However, lenses having the distortion aberration as-is have been used for special applications. For example, in a monitor imaging apparatus that is attached to the back of a vehicle and that captures images for rear-viewing, a fish-eye lens or the like to capture images of a very wide range at a super-wide angle is used so that a pedestrian who recognizes the existence of the vehicle but approaches without expecting reverse of the vehicle can be found without fail. Also, in a monitor imaging apparatus that is placed at an entrance and that captures images of visitors, a fish-eye lens or the like having a super-wide shooting range is used so that images of a suspicious person can be captured even if the suspicious person who doesn't want to be displayed in a monitor is at a position in a slanting direction with respect to the imaging apparatus.

In those lenses used for such applications, higher priority is put on imaging at a super-wide angle rather than on correction of the distortion aberration, and thus even significant distortion aberration of the fish-eye lens is left as is in many cases. However, since the fish-eye lens covers a view field of nearly 180 degrees, a subject near the edge of an image captured by the lens is distorted to a large extent, and it may be difficult to determine what a subject in the image is: a person or a pole.

On the other hand, referring to FIGS. 7A and 7B, it has been becoming a common practice to attach an imaging apparatus 31 to a back 32 of a vehicle 30, capture images during a reverse, and display the images in a display apparatus so that the vehicle can be easily parked. FIG. 7C is an enlarged cross-sectional view illustrating an attachment state of the imaging apparatus 31 and FIG. 7D is an enlarged view of a position where the imaging apparatus 31 is attached. The above-described fish-eye lens or an ordinary wide-angle lens is used in the imaging apparatus 31 in this example. In many cases, the imaging apparatus 31 is attached to the back 32 of the vehicle 30 such that the lens of the imaging apparatus 31 is oriented to the ground in a slanting direction, as illustrated in FIG. 7C.

Therefore, even if an ordinary wide-angle lens is used in the imaging apparatus 31, images obtained therefrom to be displayed are high-angle shots, that is, images with a perspective effect in which a nearer object is represented as larger and a farther object is represented as smaller, as illustrated in (A) in FIG. 8. Note that, in FIG. 8, reference numeral 40 denotes a position where a concrete wall rises, 41 denotes wheel stoppers, and 42 denotes lines indicating a parking position. However, when a driver tries to park the vehicle by reversing it while watching such an image with a perspective effect, he/she cannot sensuously recognize the distance between the vehicle and the wheel stoppers 41, so that he/she eventually reverses the vehicle by watching the back side with his/her eyes with the window or door opened, without watching a display screen. Accordingly, neither the imaging apparatus nor the display apparatus is utilized.

Furthermore, when an imaging apparatus serving as a videoconference apparatus is placed at a height, for example, images captured by the apparatus and displayed on a screen are unnatural: the heads of people are large while the other parts from the shoulders become gradually small toward the feet. This may cause a viewer of the screen to feel uncomfortable.

In such a case, an imaging apparatus that captures an image formed through a lens as image signals from an imaging device is capable of correcting data of an image having distortion or a perspective effect, unlike a silver-salt camera.

Specifically, as illustrated in (B) in FIG. 8, image data is corrected so that nearer and farther objects are displayed in the same size, for example that the lines 42 are parallel to each other and that the distance between the vehicle and the wheel stoppers 41 can be recognized. Accordingly, the driver can sensuously recognize the distance between the vehicle and the wheel stoppers 41 at a glance, which is very convenient. Even if the imaging apparatus of a videoconference apparatus is placed at a height, the viewer of the screen comfortably watches well-balanced corrected images of people.

Furthermore, in the imaging apparatus (rearview display apparatus) 31 attached to the back of the vehicle 32, if an image with a squint angle according to the attached position of the imaging apparatus as illustrated in (A) in FIG. 9 is corrected to an image of a view from a rear window of the vehicle as illustrated in (B) in FIG. 9 or to an image in which nearer and farther objects have the same size as illustrated in (B) in FIG. 8 and if the corrected image can be displayed, the utility value of the imaging apparatus 31 increases.

In a so-called digital camera, various types of image processing may be demanded, for example, electronic zooming to zoom in an arbitrary portion (e.g., center) of a captured image as illustrated in (A) in FIG. 10 in the manner illustrated in (B) in FIG. 10; and mirror-image conversion to convert a captured image as illustrated in (A) in FIG. 11 to a mirror image as illustrated in (B) in FIG. 11. That is, in the case where a user takes an image of himself/herself by holding a digital camera in hand with the lens directed to himself/herself (self shooting), if the user moves the camera in such a direction that himself/herself will be positioned at the center of a field, the camera may be actually moved in such a direction that the user departs from the center of the field because the moving direction of the camera is opposite to the moving direction of the user in the field. However, such a mistake can be avoided by using the mirror-image conversion, which realizes matching between the both directions. Also, when self shooting is performed by using zooming-in by electronic zooming, a small action is amplified, and thus, when the mirror-image conversion is not performed and when the above-described both moving directions are opposite to each other, the user may be out of the field and it may be difficult to recover an original state. Such a trouble can be avoided by using the mirror-image conversion, and the user's position for shooting can be recognized more appropriately.

In the above-described case where an imaging lens has distortion aberration or where an image captured by an imaging apparatus placed at a height has distortion due to a perspective effect, the image can be corrected in the following way. First, the correspondence between (i) the positions where respective points on a subject actually form an image by distortion aberration or high-angle photography and (ii) the positions of an image to be formed without distortion aberration or the positions of an image to be formed with a perspective effect being corrected is examined. Then, when the image data is output from an image data memory storing captured image data obtained from the imaging device, calculation is performed to determine the address in the image data memory of the captured image data to be read to output data in which aberration and a perspective effect in the respective points on the subject have been corrected in units of output addresses. Accordingly, output image data in which distortion and a perspective effect resulting from an imaging lens have been corrected can be obtained. This is the same for the cases of the above-described electronic zooming and mirror-image conversion illustrated in FIGS. 10 and 11.

For the purpose of the above-described operations, the following fish-eye lens camera apparatus using an image distortion correcting method and an image extracting method for the apparatus have been known. That is, an imaging apparatus provided with a fish-eye lens is attached at an arbitrary angle. The apparatus has a configuration to perform calculation by combining coordinate transformation to correct a perspective effect caused by the angle at which the imaging apparatus provided with the fish-eye lens is attached, and coordinate transformation to correct distortion of an image captured through the fish-eye lens. In this apparatus, high-speed map transformation can be performed on an image captured through the fish-eye lens of equisolid angle projection, a feature value of a figure or the like can be extracted by performing weighting corresponding to an area in the image captured through the fish-eye lens, and a display area can be extracted.

Typically, this process is performed by performing raster scanning on an output (write) image memory, obtaining the address of an input (read) image memory corresponding to the address of the output image data memory, and writing image data read from the input image memory of the address to the output image data memory. At this time, the address of the input image memory corresponding to the address of the output image data memory is not always an integer, and thus interpolation is required. However, since recent imaging devices have a very large number of pixels, such coordinate transformation in real time causes an enormous amount of calculation. Thus, a high-speed device is required, resulting in an expensive imaging apparatus.

Under these circumstances, the following image converting circuit to perform parallel movement, rotation, zoom in/out, and nonlinear geometrical (coordinate) transformation of an image at high speed has been known. That is, the image converting circuit includes an input image memory to accumulate original image data to be processed, an output image data memory to accumulate image data after transformation, an address calculating circuit to perform coordinate transformation on addresses in raster scanning of the output image data memory and calculate the addresses of the input image memory, and two look-up table circuits that receive two integers constituting each address output from the address calculating circuit, respectively, and that performs data conversion in accordance with a preset conversion characteristic. By using the data obtained from the two look-up table circuits as addresses, data is read from the input image memory, and the read data is written in the output image data memory.

Also, the following imaging apparatus for enabling automatic correction of distortion caused by inclination of the imaging apparatus has been known. The imaging apparatus includes inclination measuring means for measuring inclination of the imaging apparatus, electronic zooming means capable of changing magnification of a captured image, and a look-up table in which magnification is set with respect to the focal length, inclination of the imaging apparatus and the coordinates of an image. In this apparatus, magnification is determined by referring to the look-up table, the electronic zooming means is controlled by magnification control means, and a perspective effect resulting from the inclination measured by the inclination measuring means is corrected.

As described above, the amount of calculation can be reduced by preparing a look-up table for faster processing. However, when the number of pixels is very large, the size of the look-up table is also large and the cost increases accordingly.

An image processing method for performing various types of image processing at low cost and at high speed and an imaging apparatus using the method have been demanded.

SUMMARY OF THE INVENTION

Accordingly, an aspect of the invention involves an image processing method for performing image processing on captured image data obtained through an imaging lens. The method includes preparing a look-up table that stores addresses of the captured image data corresponding to addresses of an output image data at intervals of an integer a in a horizontal scanning direction and at intervals of an integer b in a vertical scanning direction, the horizontal scanning direction being an x-direction and the vertical scanning direction being a y-direction; at least one of calculating the addresses of the captured image data corresponding to the addresses of the output image data from the look-up table if the addresses of the captured image data corresponding to the addresses of the output image data exist in the look-up table and calculating the addresses of the captured image data in a first interpolation process if the addresses of the captured image data corresponding to the addresses of the output image data do not exist in the look-up table; and generating image data corresponding to the addresses of the output image data in a second interpolation process based on the captured image data by using at least one of the calculated addresses of the captured image data and the addresses of the captured image data in the look-up table, the generated image data being the output image data.

Another aspect of the invention involves an imaging apparatus including an imaging lens; an imaging device performing photoelectric conversion on an image obtained through the imaging lens; an image signal processing unit processing an output signal from the imaging device and converting the signal to image data; a captured image data memory temporarily storing the image data processed by the image signal processing unit; a coordinate transforming unit receiving the image data stored in the captured image data memory and performing coordinate transformation to generate output image data on which at least one of correction of image distortion resulting from the imaging lens, correction of image inclination due to at least one of a perspective effect and a high-angle view, change of a viewpoint, conversion to a mirror image, and electronic zooming has been performed; and a look-up table storing addresses of the captured image data memory corresponding to addresses of the output image data, and including the addresses of the captured image data memory corresponding to the addresses of the output image data at intervals of an integer a in a horizontal scanning direction and at intervals of an integer b in a vertical scanning direction, the coordinate transforming unit comprising: a first interpolating unit to calculate the addresses of the captured image data memory corresponding to the addresses of the output image data when the addresses of the captured image data memory do not exist in the look-up table; and a second interpolating unit to calculate image data corresponding to the addresses of the output image data based on the captured image data by using at least one of the addresses of the captured image data memory calculated by the first interpolating unit and the addresses of the captured image data in the look-up table.

A further aspect of the invention involves an image processing method including storing corresponding addresses of original image data in respective addresses of a look-up table, the number of the respective addresses being smaller than the number of addresses that are necessary in output image data; determining whether the addresses of the original image data corresponding to the addresses of the output image data exist in the look-up table; calculating the addresses of the original image data in a first interpolation process if the addresses do not exist in the look-up table; and generating the output image data corresponding to the addresses of the output image data in a second interpolation process based on the original image data by using at least one of the calculated addresses of the original image data and the addresses of the original image data in the look-up table.

BRIEF DESCRIPTION OF THE DRAWINGS

FIG. 1 is a block diagram of an imaging apparatus using an image processing method according to an embodiment;

FIG. 2 is a flowchart of a process performed by the imaging apparatus using the image processing method according to the present embodiment;

FIG. 3 illustrates a configuration of a look-up table used in the image processing method according to the present embodiment;

FIGS. 6A and 6B illustrate a configuration of look-up tables used in the image processing method according to the present embodiment;

FIG. 10 illustrates electronic zooming to zoom in an arbitrary portion of image (A) obtained from an imaging apparatus to image (B); and FIG. 11 illustrates mirror-image conversion of image (A) obtained from an imaging apparatus to image (B).

DESCRIPTION OF THE PREFERRED EMBODIMENTS

Figures 4A, 4B, 4C:
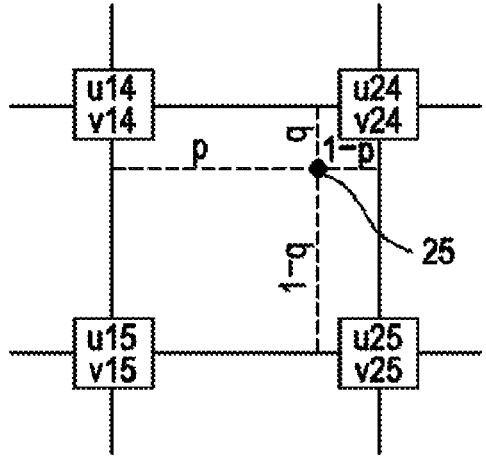
FIG. 4A illustrates a look-up table used in the image processing method according to the present embodiment.
FIG. 4B illustrates a method for calculating addresses (u, v) of captured image data by using the look-up table.
FIG. 4C illustrates that look-up table data is composed of two bytes.

Hereinafter, a preferred exemplary embodiment of the present invention is described in detail with reference to the drawings. Note that the form of the elements described in this embodiment is only an example and the scope of the invention is not limited thereto. In this embodiment, "various types of image processing" include correction of image distortion resulting from an imaging lens, correction of image inclination due to a perspective effect or a high-angle view, change of a viewpoint, mirror-image conversion, and electronic zooming.

First, an outline of the embodiment of the present embodiment is described. Output image data generated by performing at least one of the various types of image processing on an image obtained through an imaging lens can be obtained with a simple configuration at low cost and at high speed by using a small-sized look-up table (hereinafter abbreviated as LUT).

According to the present embodiment, a LUT having addresses is prepared. The number of addresses in LUT is very small relative to the number of pixels of output image data. Specifically, the number of pixels in a horizontal scanning direction (x-direction) of output image data is defined as "n", the number of pixels in a vertical scanning direction (y-direction) is defined as "m", and "a" and "b" are defined as integers. The LUT includes an origin, the position of the n-th pixel in the x-direction, and the position of the m-th pixel in the y-direction of the output image data, and $\{(n/a)+1\}$ addresses in the x-direction and $\{(m/b)+1\}$ addresses in the y-direction, that is, $\{(n/a)+1\}\times\{(m/b)+1\}$ addresses in total. The integers "a" and "b" may be the same, but should be different from each other in the case where any one of the x- and y-directions of an image obtained through a fish-eye lens should be corrected with higher accuracy than the other. Preferably, the integers "a" and "b" should be power of two. Using power of two as "a" and "b" simplifies division that is performed to refer to addresses of the LUT based on addresses of output image data, so that calculation time can be shortened.

The respective addresses (x', y') in the LUT store the addresses (u, v) of captured image data corresponding to the addresses (x, y) at intervals of "a" in the x-direction and at intervals of "b" in the y-direction including the origin, the position of the n-th pixel in the x-direction, and the position of the m-th pixel in the y-direction in output image data. By using the LUT, the addresses (u, v) of captured image data corresponding to the addresses (x, y) of output image data are calculated. If addresses have a value including a fractional portion and do not exist in the LUT, the addresses (u, v) of the captured image data are calculated in a first interpolation process, and then image data corresponding to the addresses (x, y) of the output image data is calculated based on the addresses in a second interpolation process.

That is, in the first interpolation process, each address in the x-direction of the output image data is divided by "a" and each address in the y-direction is divided by "b". The respective quotients, which may include a fractional portion, are regarded as the addresses (x', y') of the LUT, and the corresponding addresses (u, v) of the captured image data are calculated by interpolation. In the second interpolation process, output image data is calculated by using captured image data positioned around the addresses (u, v) that are calculated in the first interpolation process and that may include a fractional portion.

In this way, the size of the LUT can be reduced, and captured image data corresponding to the addresses (x, y) of output image data can be output by using simple interpolation. Therefore, various types of image processing can be performed with a simple configuration at low cost and at high speed, whereby an imaging apparatus capable of performing various types of image processing at low cost and at high speed can be provided.

As described above, the LUT includes a very small number of addresses relative to the number of pixels of output image data, that is, at intervals of "a" in the x-direction and at intervals of "b" in the y-direction of output image data. Furthermore, the addresses of captured image data corresponding to the addresses of output image data are obtained from the LUT. If the addresses corresponding to the addresses of the output image data do not exist in the LUT, the addresses of the captured image data are calculated in the first interpolation process, and the image data corresponding to the addresses of the output image data is calculated in the second interpolation process based on the addresses of the captured image data. Accordingly, captured image data corresponding to the addresses of the output image data can be output by using simple interpolation.

Now, the present embodiment is further described with reference to FIGS. 3 to 5. As illustrated in (A) in FIG. 3, the number of pixels "n" in the horizontal scanning direction (x-direction) of an imaging device is 640, in which "x" is in the range of $0 \leq x \leq 639$, the number of pixels "m" in the vertical scanning direction (y-direction) is 480, in which "y" is in the range of $0 \leq y \leq 479$, and both "a" and "b" are 80. In this case, a LUT as illustrated in (B) in FIG. 3 is prepared. The LUT includes 63 addresses (x', y'): $\{(640/80)+1\}=9$ (i.e., 0 to 8) in the x'-direction; and $\{(480/80)+1\}=7$ (i.e., 0 to 6) in the y'-direction.

FIG. 4A illustrates a specific example of the LUT illustrated in (B) in FIG. 3, in which the horizontal direction indicates x'-direction addresses in the LUT, whereas the vertical direction indicates y'-direction addresses in the LUT. In an address (0, 0) of the LUT, an address (u00, v00) of captured image data corresponding to an address (0, 0) of output image data is stored. Also, in an address (1, 0) in the x'-direction of the LUT, an address (u10, v10) of captured image data corresponding to an address (80, 0), which is a×1 in the x-direction of output image data, is stored. Also, in an address (2, 0) of the LUT, an address (u20, v20) of captured image data corresponding to an address (60, 0), which is a×2 in the x-direction of output image data, is stored. In this manner, addresses (u, v) of captured image data are stored in the LUT. In an address (8, 0) of the LUT, an address (u80, v80) corresponding to an x-direction address (639, 0) of output image data is stored.

In the second row of the LUT, addresses of b×1 in the y'-direction of the LUT are applied. In respective addresses in the x'-direction, addresses (u01, v01), (u11, v11), (u21, v21) . . . (u81, v81) of captured image data corresponding to addresses (0, 80), (80, 80), (160, 80), . . . (639, 80) of multiples of "a" in the x-direction of output image data are stored in the same manner as described above. This is the same for the other addresses to (8, 6) in the LUT. In the address (8, 6), (u86, v86) corresponding to an address (639, 479) of output image data is stored.

Figure 5:
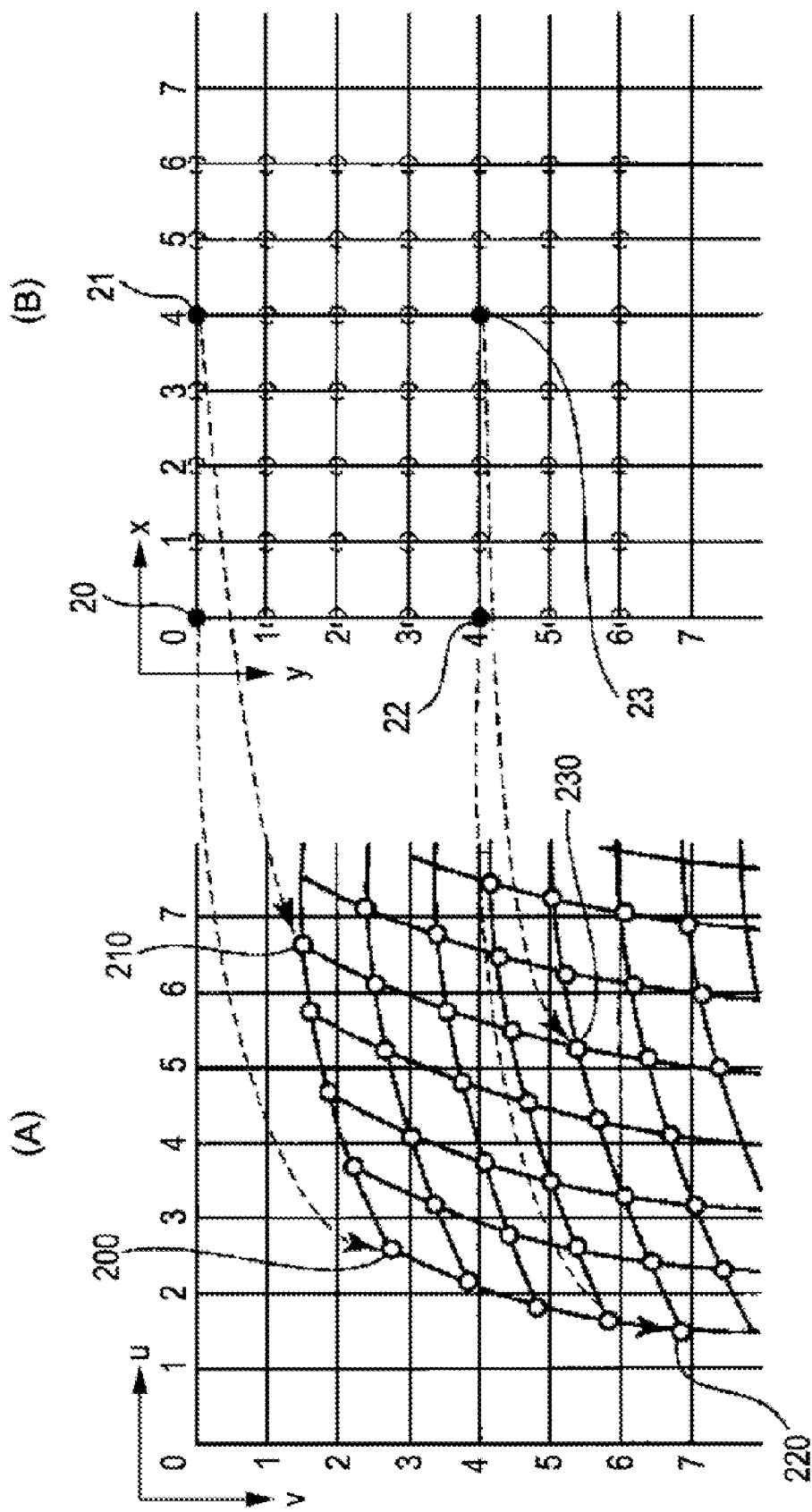
FIG. 5 illustrates the correspondence between addresses of captured image data (A) obtained in the imaging apparatus using an imaging lens causing distortion and addresses of output image data (B) in which the distortion has been corrected, the output image data (B) being obtained based on the captured image data (A)
Figure 7B:
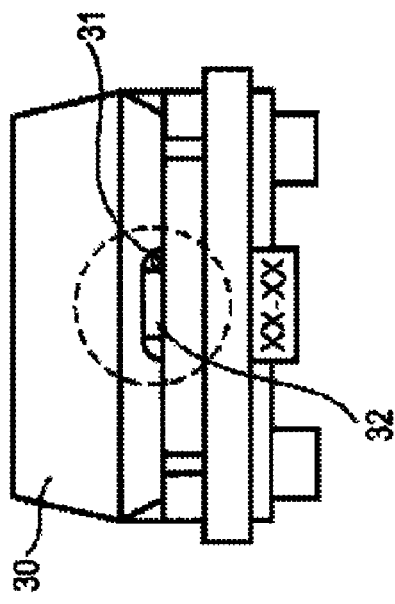
FIGS. 7A and 7B are a side view and a back view illustrating the position of the imaging apparatus attached to the back of a vehicle.
Figure 7A:
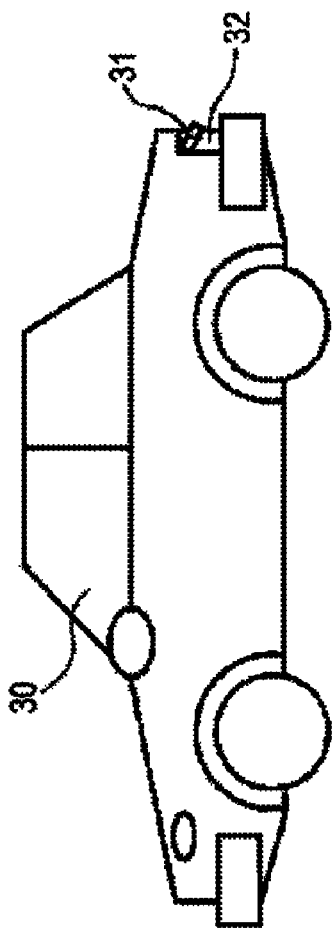
Figure 7D:
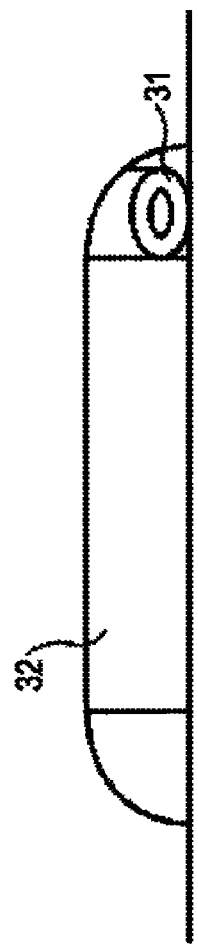
FIG. 7D is an enlarged view of the attached position.
Figure 7C:
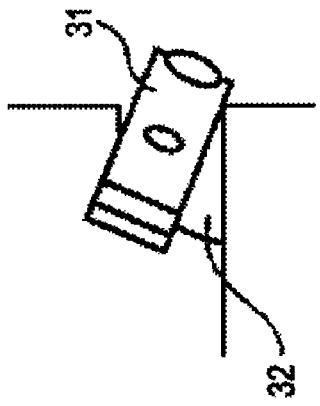
FIG. 7C is an enlarged cross-sectional view illustrating a state where the imaging apparatus is attached.
Figure 8:
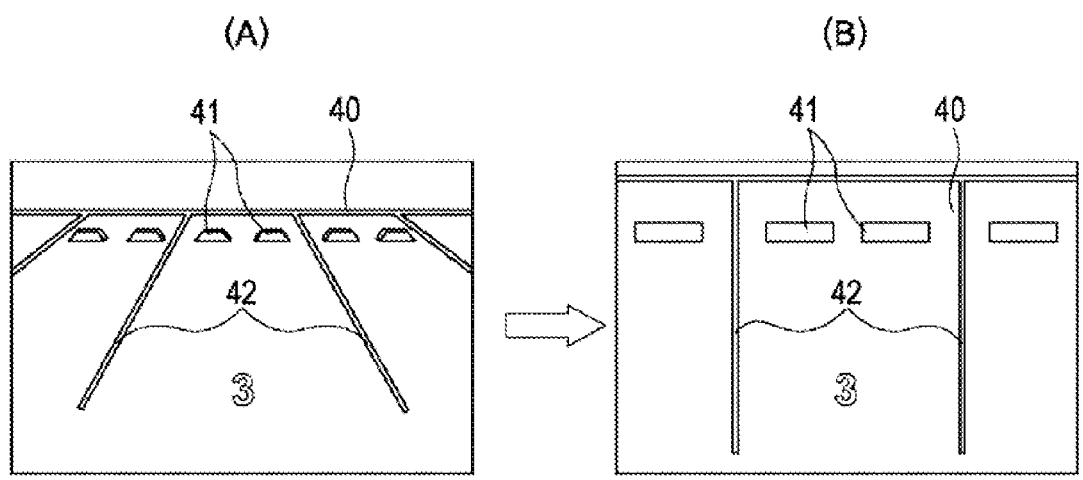
FIG. 8 illustrates image (A) with a perspective effect captured at a high angle by an imaging apparatus using a wide-angle lens and image (B) in which the perspective effect has been corrected.
Figure 9:
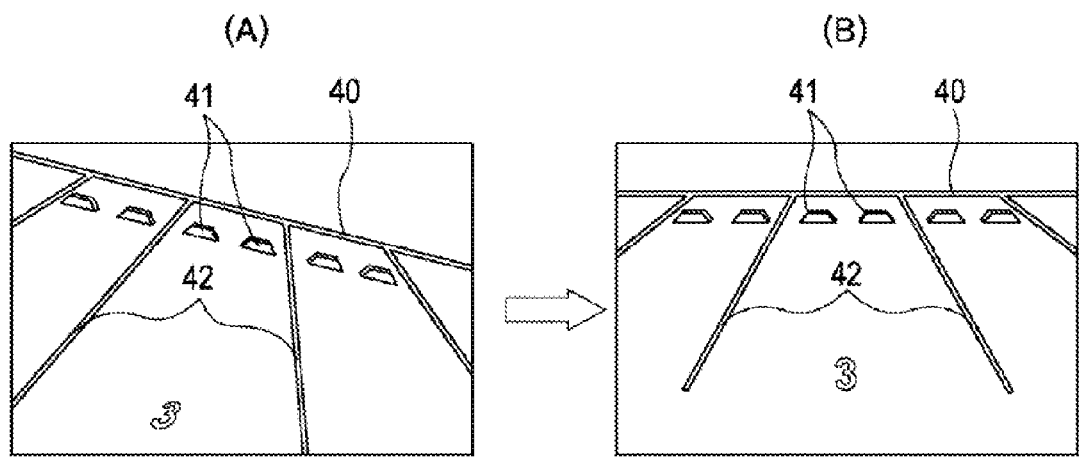
FIG. 9 illustrates image (A) with a perspective effect captured at a high angle by an imaging apparatus using a wide-angle lens and image (B) generated by changing a viewpoint.

FIG. 5 illustrates the correspondence between actual output image data and captured image data. Specifically, FIG. 5 illustrates the correspondence between addresses (u, v) of captured image data (A) and addresses (x, y) of output image data (B) in order to obtain output image data (B) in which distortion has been corrected based on captured image data (A) that is obtained in an imaging apparatus including an imaging lens that causes distortion, such as a fish-eye lens. Here, each of the integers "a" and "b" is 4 for easy understanding.

The address (u, v) of captured image data (A) corresponding to the address (0, 0) denoted by numeral 20 in output image data (B) is an address (2.7, 2.8) denoted by numeral 200 in captured image data (A) indicated by an arrow starting from the position denoted by numeral 20, due to distortion of the imaging lens. Thus, in the address (0, 0) of the LUT, an address (u00=2.7, v00=2.8) denoted by numeral 200 of the captured image data is stored.

Likewise, the address of captured image data (A) corresponding to the address (4, 0) of a×1 in the x-direction denoted by numeral 21 of output image data (B) is an address (6.6, 1.5) denoted by numeral 210 in captured image data (A) indicated by an arrow starting from the position denoted by numeral 21. Thus, in the address (1, 0) of the LUT, an address (u10=6.6, v10=1.5) denoted by numeral 210 in the captured image data is stored.

In the example illustrated in FIG. 5, the integers "a" and "b" are 4, and thus data is stored in the following manner. In the address (0, 0) of the LUT, the address (u00=2.7, v00=2.8) denoted by numeral 200 in the captured image data corresponding to the address (0, 0) denoted by numeral 20 in the output image data is stored. In the address (1, 0) of the LUT, the address (u10=6.6, v10=1.5) denoted by numeral 210 in the captured image data corresponding to the address (4, 0) denoted by numeral 21 of a×1 in the x-direction in the output image data is stored.

Also, in the address (0, 1) in the second row of the LUT, an address (1.5, 6.9) denoted by numeral 220 in the captured image data corresponding to an address (0, 4) of b×1 in the y-direction denoted by numeral 22 in the output image data is stored. In the address (1, 1) of the LUT, an address (5.2, 5.3) denoted by numeral 230 in the captured image data corresponding to an address (4, 4) of a×1 in the x-direction denoted by numeral 23 in the output image data is stored. In this way, data is stored.

With this configuration, the LUT has a very small size, as described above. Also, since calculation can be simplified compared to the case where calculation is performed on all the points, a high-speed imaging apparatus can be less expensive.

Hereinafter, a method for obtaining output image data based on captured image data by using the LUT having the above-described configuration is described. First, addresses of the LUT are calculated by dividing the addresses of the output image data by the above-described "a" in the horizontal scanning direction and the above-described "b" in the vertical scanning direction. Among the calculated addresses, an address existing in the LUT (an address of which values do not include a fractional portion) is left as is, whereas an address not existing in the LUT (an address of which values include a fractional portion) is processed in the first interpolation process. That is, the address of the captured image data corresponding to the address of the output image data is calculated in the first interpolation process.

As described above, the addresses of the LUT are composed of integers that are incremented by one at intervals of "a" in the horizontal direction and at intervals of "b" in the vertical direction with respect to the addresses of the output image data. Thus, by dividing the addresses of the output image data by "a" in the x-direction and by "b" in the y-direction, the addresses other than multiples of "a" and "b" have values including a fractional portion. When the addresses have values including a fractional portion, the addresses of the captured image data cannot be obtained from the LUT. Therefore, the addresses of the captured image data are calculated in the first interpolation process using bilinear interpolation or the like, by using the addresses of the LUT around the quotients calculated by dividing the addresses of the output image data by "a" and "b" (that is, addresses on the LUT).

As described above with reference to FIG. 3, assume that the number of pixels "n" in the x-direction of the imaging device is 640, in which "x" is in the range of $0 \leq x \leq 639$, that the number of pixels "m" in the y-direction is 480, in which "y" is in the range of $0 \leq y \leq 479$, and that both "a" and "b" are 80. Under this condition, the case of calculating the coordinates of the captured image data corresponding to coordinates (x, y)=(140, 340) in the output image data is discussed, for example. First, the coordinates (x', y') of the LUT are calculated in the following manner: x'=140/80=1.75; and y'=340/80=4.25.

Therefore, the coordinates (x, y)=(140, 340) in the output image data correspond to a point denoted by numeral 25 in FIG. 4B surrounded by the addresses (1, 4), (2, 4), (1, 5), and (2, 5) on the LUT. On the captured image data, the coordinates correspond to a point surrounded by the addresses (u14, v14), (u24, v24), (u15, v15), and (u25, v25). Then, the address (u, v) of the captured image data is calculated in the first interpolation process, for example, in a bilinear interpolation process according to the following expressions (1) and (2).

$$u=(1-p)(1-q)*u14+p(1-q)*u24+(1-p)q*u15+pq*u25 \quad (1)$$

$$v=(1-p)(1-q)*v14+p(1-q)*v24+(1-p)q*v15+pq*v25 \quad (2)$$

Here, p=0.75 and q=0.25.

After the address (u, v) of the captured image data has been calculated, captured image data Iin (u, v) in the address (u, v) of the captured image data is obtained. This corresponds to output image data Iout (140, 340) corresponding to the coordinates (x, y)=(140, 340) in the output image data. Note that Iin and Iout obtained here are data of a luminance value (Y) in the case of a monochrome image or data of RGB or YUV in the case of a color image.

Now, assume that an address (u, v) in the captured image data is (13.4, 87.6). Iin (13.4, 87.6) does not exist on the captured image data, and thus the second interpolation process, for example, a bicubic interpolation process according to the following expressions (3) to (6), is performed to obtain this captured image data based on the data of 16 pixels around the address (u, v)=(13.4, 87.6) in the captured image data.

$$f(t) = \frac{\sin \pi t}{\pi t} \quad (3)$$

$$x1 = 1 + 0.4, x2 = 0.4, x3 = 1 - 0.4, x4 = 2 - 0.4 \quad (4)$$

$$y1 = 1 + 0.6, y2 = 0.6, y3 = 1 - 0.6, y4 = 2 - 0.6 \quad (5)$$

-continued $$Iout(140, 340) = [f(y1)f(y2)f(y3)f(y4)] \times \begin{bmatrix} Iin(12,86) & Iin(13,86) & Iin(14,86) & Iin(15,86) \\ Iin(12,87) & Iin(13,87) & Iin(14,87) & Iin(15,87) \\ Iin(12,88) & Iin(13,88) & Iin(14,88) & Iin(15,88) \\ Iin(12,89) & Iin(13,89) & Iin(14,89) & Iin(15,89) \end{bmatrix} \begin{bmatrix} f(x1) \\ f(x2) \\ f(x3) \\ f(x4) \end{bmatrix} \quad (6)$$

The LUT is used in the above-described manner in order to obtain output image data based on captured image data. The LUT can be constituted by a very small number of addresses, and captured image data corresponding to the addresses of output image data can be output by simple interpolation processes including the first and second interpolation processes. Accordingly, there can be provided an imaging apparatus capable of performing various types of image processing: correction of image distortion resulting from an imaging lens; high-angle or overhead photography; generation of an image by changing a viewpoint of a captured image; conversion of a captured image to a mirror image; and electronic zooming, with a simple configuration at low cost and at high speed.

Additionally, the LUT for each of high-angle or overhead photography; generation of an image by changing a viewpoint of a captured image; conversion of a captured image to a mirror image; and electronic zooming may be created in the manner described above with reference to FIGS. 3 to 5 by regarding (A) as captured image data and (B) as output image data in FIGS. 8 to 11, respectively. For correction of image distortion resulting from an imaging lens, the LUT corresponding to distortion that occurs in the imaging lens as illustrated in FIG. 5 may be used.

As illustrated in FIG. 4A, in the case where the addresses (u, v) of captured image data stored in the respective addresses (x', y') of the LUT are composed of 2 bytes (16 bits) as illustrated in FIG. 4C, address data of both u and v can be obtained by one table search by assigning each address u to higher-order bits 0 to 7 and each address v to lower-order bits 8 to 15.

In this way, an address in the x- and y-directions can be obtained by one table search.

In the LUT illustrated in FIG. 4A, both u and v addresses of captured image data are stored in the respective addresses (x', y'). Alternatively, separate LUTs for u addresses and v addresses may be provided as illustrated in FIGS. 6A and 6B. In this case, the addresses (u, v) of captured image data can be separately calculated and the process can be simplified accordingly.

Hereinafter, an imaging apparatus performing the image processing method and the operation of the apparatus are described with reference to FIGS. 1 and 2.

The imaging apparatus includes an imaging lens 1. The lens 1 used in the imaging apparatus includes a so-called wide-angle lens having an angle of field of more than 35 degrees in the longitudinal direction; or a so-called fish-eye lens having an angle of field of nearly 180 degrees or more, which is a super-wide-angle lens having distortion aberration. The present invention exhibits a great effect when such a wide-angle lens is used. However, it is obvious that a lens of any angle of field may be used as long as a perspective effect is obtained in high-angle photography. For example, a lens called a normal lens in a general photography field or a telephoto lens approximate to the normal lens may be used.

The imaging apparatus also includes a solid-state imaging device 2, such as a charge coupled device (CCD) or a complementary metal oxide semiconductor (CMOS); a image signal processing unit 3 to remove a noise component from an analog image signal from the solid-state imaging device 2, amplify the analog image signal, and convert the analog image signal to a digital image signal; and a captured image data memory 4 to store captured image data corresponding to the digital image signal generated through conversion.

The imaging apparatus also includes a coordinate transforming unit 5 to perform at least one of the various types of image processing in accordance with the image processing method. The coordinate transforming unit 5 includes an output image generating unit 51 to generate output image data on which the above-described correction has been done in accordance with the image processing method; and a coordinate calculating unit 52 to sequentially obtain addresses of the output image data output from the output image generating unit 51 and transmit the addresses to a first interpolating unit 53, so that the data in the captured image data memory 4 corresponding to the transmitted addresses is eventually transmitted to the output image generating unit 51.

The first interpolating unit 53 transforms addresses (x, y) of the output image data to be generated by the output image generating unit 51 transmitted from the coordinate calculating unit 52 to addresses (x', y') of a LUT 54 and calculates corresponding addresses (u, v) of the captured image data memory 4 based on the addresses of the LUT 54. The LUT 54 is a look-up table that is generated in the method described above with reference to FIGS. 3 to 5 and that stores addresses of the captured image data memory 4 corresponding to the addresses of the output image data. A second interpolating unit 55 generates captured image data of the addresses (u, v) of the captured image data memory 4 corresponding to the addresses (x, y) of the output image data calculated by the first interpolating unit 53.

In the imaging apparatus having the above-described configuration, when the process illustrated in the flowchart in FIG. 2 starts in step S10, analog image data of an image formed on the solid-state imaging device 2 through the imaging lens 1 is transmitted to the image signal processing unit 3, where noise is removed and the data is amplified and is converted to digital image signals, which are stored in the captured image data memory 4. In the case where an output from the solid-state imaging device 2 is image signals of an interlace method, if image processing is performed on data in an odd-number field and data in an even-number field separately, interpolation intervals become long and image quality degrades. Therefore, it is preferred that data in an odd-number field and data in an even-number field are combined in the captured image data memory 4 into frame data and that the frame data is output as data in the interlace method or progressive method from the output image generating unit 51.

The output image data can be precise by combining image data in an odd-number field and image data in an even-number field, correcting the combined image data, and then outputting the image data in the interlace scanning method or progressive scanning method.

After the image signals have been stored in the captured image data memory 4, the coordinate calculating unit 52 calculates the addresses (x, y) of the output image data and transmits them to the output image generating unit 51 and the first interpolating unit 53 in step S11 in FIG. 2. The addresses (x, y) of the output image data transmitted to the first interpolating unit 53 are divided by integers "a" and "b" in the above-described manner, so that reference addresses (x', y') of the LUT 54 are generated in step S12.

The LUT reference addresses (x', y') are used for referring to the LUT 54 in step S13. Then, in step S14, the first interpolating unit 53 performs the above-described bilinear interpolation on the obtained data so as to calculate the addresses (u, v) of the captured image data memory 4. Then, the process proceeds to step S15.

In step S15, the captured image data memory 4 is referred to by using the addresses (u, v) of the captured image data memory 4, the second interpolating unit 55 performs the above-described bicubic interpolation so as to obtain captured image data around the addresses (u, v) of the captured image data memory 4, so that captured image data in the captured image data addresses (u, v) corresponding to the addresses (x, y) of the output image data is generated.

In step S16, the generated captured image data is transmitted to the output image generating unit 51 and is transmitted to an output image data memory or a display apparatus (not illustrated). In step S17, it is determined whether all output image data of one frame have been obtained. If the determination is "No", the process returns to step S11 and the same steps are repeated. If the determination is "Yes", the process proceeds to step S18 and the process ends.

As described above, the LUT having a very small number of addresses relative to the number of pixels of output image data is used. Also, the addresses of captured image data are obtained by the first interpolation process and image data corresponding to the addresses of output image data is obtained in the second interpolation process. Accordingly, an imaging apparatus capable of performing various types of image processing with a simple configuration at low cost and at high speed can be provided without using an expensive large-size LUT or an expensive high-speed device.

In the description given above, the case where calculation of captured image data corresponding to output image data is performed on all the addresses of the output image data is described as an example. However, when image distortion resulting from distortion aberration of the imaging lens is to be corrected, for example, since the amount of distortion may be small and indistinctive near the center of an optical axis, the correction may be performed on captured image data except the portion of small distortion, that is, near the center of the optical axis. Accordingly, the amount of calculation can be reduced and higher-speed processing can be realized.

The present embodiment provides an imaging apparatus capable of performing various types of image processing with a simple configuration at low cost and at high speed, and can be preferably applied to a mobile terminal such as a mobile phone, a monitor imaging apparatus for a vehicle, an imaging apparatus to be placed at an entrance, a monitoring apparatus, a videoconference imaging apparatus, and so on.

The invention claimed is:

1. An image processing method for performing image processing on captured image data obtained through an imaging lens of an imaging apparatus, the method comprising the steps of:

preparing a look-up table that stores addresses of the captured image data corresponding to addresses of an output image data at intervals of an integer 'a' in a horizontal scanning direction and at intervals of an integer 'b' in a vertical scanning direction, the horizontal scanning direction being an x-direction and the vertical scanning direction being a y-direction;

at least one of calculating the addresses of the captured image data corresponding to the addresses of the output image data from the look-up table if the addresses of the captured image data corresponding to the addresses of the output image data exist in the look-up table and calculating the addresses of the captured image data in a first interpolation process if the addresses of the captured image data corresponding to the addresses of the output image data do not exist in the look-up table; and generating image data corresponding to the addresses of the output image data in a second interpolation process based on the captured image data by using at least one of the calculated addresses of the captured image data and the addresses of the captured image data in the look-up table, the generated image data being the output image data.

2. The image processing method according to claim 1, wherein the image processing includes at least one of correction of distortion, correction of image inclination due to at least one of a perspective effect and a high-angle view, change of a viewpoint, conversion to a mirror image, and electronic zooming.

3. The image processing method according to claim 1, wherein the look-up table includes $\{(n/a)+1\}\times\{(m/b)+1\}$ addresses including an origin, a maximum pixel position in the x-direction, and a maximum pixel position in the y-direction, 'n' being the number of pixels in the x-direction and 'm' being the number of pixels in the y-direction in the output image data, the respective addresses storing the addresses of the captured image data corresponding to the addresses of the output image data.

4. The image processing method according to claim 3, wherein the first interpolation process is performed by dividing the x-direction addresses of the output image data by the integer 'a' and the y-direction addresses of the output image data by the integer 'b', and by calculating the corresponding addresses of the captured image data by using the respective quotients as the addresses of the look-up table.

5. The image processing method according to claim 4, wherein the second interpolation process is performed by using captured image data positioned around the addresses of the captured image data corresponding to the addresses of the output image data calculated in the first interpolation process.

6. The image processing method according to claim 3, wherein each of the integers 'a' and 'b' is power of two.

7. The image processing method according to claim 5, wherein bilinear interpolation is used as the first interpolation process and bicubic interpolation is used as the second interpolation process.

8. The image processing method according to claim 1, wherein correction of image distortion resulting from the imaging lens is performed on the captured image data except a portion near the center of an optical axis.

9. The image processing method according to claim 3, wherein each of the addresses of the captured image data stored in the look-up table is bit-string data composed of higher-order bits and lower-order bits, and wherein an x-direction address of the captured image data is assigned to one of the higher-order bits and the lower-order bits and a y-direction address of the captured image data is assigned to the other.

10. The image processing method according to claim 1, wherein the look-up table includes separate look-up tables for x-direction addresses and y-direction addresses of the captured image data, respectively.

11. The image processing method according to claim 1, wherein, when the captured image data is based on an interlace scanning method, a frame of image as captured image data is generated from images in an odd-number field and an even-number field in the captured image data, and wherein output image data generated in accordance with the addresses of the output image data is output in at least one of the interlace scanning method and a progressive scanning method.

12. An imaging apparatus comprising:
an imaging lens;
an imaging device performing photoelectric conversion on an image obtained through the imaging lens;
an image signal processing unit processing an output signal from the imaging device and converting the signal to image data;
a captured image data memory temporarily storing the image data processed by the image signal processing unit;
a coordinate transforming unit receiving the image data stored in the captured image data memory and performing coordinate transformation to generate output image data on which at least one of correction of image distortion resulting from the imaging lens, correction of image inclination due to at least one of a perspective effect and a high-angle view, change of a viewpoint, conversion to a mirror image, and electronic zooming has been performed; and
a look-up table storing addresses of the captured image data memory corresponding to addresses of the output image data, and including the addresses of the captured image data memory corresponding to the addresses of the output image data at intervals of an integer 'a' in a horizontal scanning direction and at intervals of an integer 'b' in a vertical scanning direction,
the coordinate transforming unit comprising:
a first interpolating unit to calculate the addresses of the captured image data memory corresponding to the addresses of the output image data when the addresses of the captured image data memory do not exist in the look-up table; and
a second interpolating unit to calculate image data corresponding to the addresses of the output image data based on the captured image data by using at least one of the addresses of the captured image data memory calculated by the first interpolating unit and the addresses of the captured image data in the look-up table.

13. The imaging apparatus according to claim 12, wherein the imaging lens is at least one of a wide-angle lens and a fish-eye lens.

* * * * *